United States Patent [19]

Dodd

[11] 4,123,367
[45] Oct. 31, 1978

[54] METHOD OF REDUCING DRAG AND ROTATING TORQUE IN THE ROTARY DRILLING OF OIL AND GAS WELLS

[76] Inventor: Anita A. Dodd, 445 The Main Bldg., Houston, Tex. 77002

[21] Appl. No.: 791,425

[22] Filed: Apr. 29, 1977

[51] Int. Cl.² ............................ C09K 7/04; C09K 7/06
[52] U.S. Cl. .................................... 252/8.5 B; 175/65; 252/8.5 M
[58] Field of Search ............. 252/8.5 B, 8.5 M, 8.5 R; 175/65

[56] References Cited

U.S. PATENT DOCUMENTS

| 2,334,578 | 11/1943 | Potters | 65/21 |
|---|---|---|---|
| 3,047,494 | 7/1962 | Browning | 252/8.5 C |
| 3,174,561 | 3/1965 | Sterrett | 252/8.5 R X |
| 3,186,812 | 6/1965 | Pfaender | 252/8.5 B X |
| 3,216,933 | 11/1965 | Park et al. | 252/8.5 B |
| 3,242,032 | 3/1966 | Schott | 252/8.55 R X |
| 3,485,753 | 12/1969 | Allais | 252/28 X |
| 3,575,858 | 4/1971 | Adair et al. | 252/28 X |

Primary Examiner—Richard D. Lovering

[57] ABSTRACT

A method of reducing drag and rotating torque in the rotary drilling of oil and gas wells comprising the incorporation of quantities of minute spherical glass beads in a liquid drilling fluid.

3 Claims, No Drawings

METHOD OF REDUCING DRAG AND ROTATING TORQUE IN THE ROTARY DRILLING OF OIL AND GAS WELLS

CROSS-REFERENCE TO RELATED APPLICATION

Cross-reference is hereby made to application Ser. No. 739,657 filed Nov. 8, 1976, and now abandoned, entitled "Drilling Mud Additive."

BACKGROUND OF THE INVENTION

In drilling oil and gas wells and the like by the rotary drilling method, a string of drill pipe having a drill bit mounted on the lower end thereof is rotated to cause the cutting elements or "teeth" on the bit to drill the hole. Drilling fluid is circulated through the drill pipe emerging through openings in the drill bit returning to the surface in the annular space between the drill pipe and the walls of the borehole. Such circulation is substantially continuous while drilling, being interrupted by essential operations, such as adding an additional section of drill pipe at the top of the drill string or when the entire string of drill pipe is pulled from the wellbore to replace a worn-out drill bit.

In addition to removing drill cuttings from the hole the drilling fluid performs many functions vital to a successful drilling operation. These functions have been discussed by Rodgers ("Composition and Properties of Oil Well Drilling Fluids," Water F. Rodgers, pps. 10-18, Gulf Publishing Company, Houston, Texas, 1963).

In the drilling of wells sand contamination of drill fluid results from the drilling of sandy shales and sandstones. Sand is a highly undesirable mechanical contaminant because sand is considerably harder than most steels and its abrasive qualities cause rapid and excessive wear of pipe elbows and reciprocating and centrifugal pumps. Higher sand contents in drilling fluids increase drill pipe friction resulting in increasing rotating torque and drag. The rapid settling of sand may even stick drill pipe in the hole or cause core barrels to fail to operate. Sand may also bridge outside the casing and prevent a satisfactory cementing operation. For these reasons, drilling operators make every reasonable effort to keep sand out of drilling fluids; sand contents of 2 or 3 percent can be tolerated but if the percentage rises, steps must be taken to reduce the sand content.

Crooked holes, including doglegs, corkscrews, and boreholes deviating from the vertical are a primary cause of excessive torque and drag.

It is important to recognize that ordinary crooked holes can be significantly minimized by good drilling engineering practice. However, current economic and environmental considerations dictate that an increasing number of wells, both on land and offshore, be deliberately deviated. In such deviated holes where the borehole is at an angle from the vertical, the drill string must rest against the side of the wellbore. This lateral force significantly increases normal rotating torque and drag over that of vertical drilling, notwithstanding whether the drilling fluid is oil base or water base. This frictional effect becomes very important in current offshore drilling where 20 to 22 wells are drilled from a single platform and the deviation of the wellbore from vertical is sixty degrees or more.

The rate at which the hole can be made depends in part upon the rate of rotation of the drill pipe and upon the "weight on bottom" or force with which the drill bit acts on the bottom of the hole. This force is controlled by addition to drill collars which are pipes of larger diameter and greater mass than drill pipe. It is, therefore, very desirable to minimize friction upon the drill string and maximize horsepower at the bit.

Clearly, high rotational friction or high drag friction in removing a string of drill pipe miles in length for the purpose of periodically changing bits can severely limit the ability and efficiency of a given derrick to drill deep wells and also increases the cost of drilling.

In present day offshore drilling there are areas where basic rig overhead costs are $50,000 or more per day. It is, therefore, economically desirable to drill as rapidly as possible with minimum equipment and power.

Current drilling fluid technology predicated upon maintaining low clay solids in aqueous drilling muds also contributes to increasing rotating torque and pipe drag. Traditional drilling muds contained an appreciable component of hydrated bentonite which acted as a borehole lubricant. With the advent of solids control equipment and the deliberate reduction in bentonite content for the purpose of increasing penetration rate and minimizing formation damage, this lubricating effect of bentonite has been greatly reduced.

Even with traditional bentonitic drilling fluids and techniques, the friction of running pipe into and out of the hole, the increases in torque and power to rotate the drill pipe, the wear and stress on drill pipe and danger of twist offs of the drill pipe has caused numerous drilling fluid lubricants to be investigated.

The prior art shows such lubricant drilling additives to be composed of saturated or unsaturated fatty acids, mixtures of fatty acids and resin acids, naturally occurring triglycerides, stearates of aluminum and other metals, fatty amides, sulfurized vegetable oils, sulfated fatty acids and fatty alcohols and mixtures thereof and their solutions or emulsions in water or primary alcohols of 12 to 15 carbon atoms.

In general all sorts of soft solids including graphite, blown asphalts, gilsonite, soaps, plastics (such as polyethylene or Teflon particle dispersions), have been proposed as drilling fluid lubricants. A wide variety of such substances that have a known performance history as boundary or hydrodynamic lubricants in industry have been introduced as drilling fluid lubricant additives, as for example in U.S. Pat. Nos. 2,773,030; 2,773,031; 3,014,862; 3,027,324; 3,047,493; 3,047,494; 3,048,538; 3,214,374; 3,242,160; 3,275,551; 3,340,188; 3,372,112; 3,377,276; and 3,761,410.

Ground walnut hulls are commonly used in drilling fluids for lost circulation control. It is, however, a matter of common knowledge that when angular walnut hull fragments are introduced into a circulating drilling fluid that some reduction in rotating torque occurs and that sticking tendencies of the drill pipe are reduced. It is further known that this lubricating effect decreases with time, presumably because of chemical disintegration of the nut hulls in the circulating drilling fluid. It has been further shown in the prior art, specifically U.S. Pat. No. 2,943,679, Table V, that the lubricity effect of walnut shells is maximum in the 4 to 10 mesh size range and diminishes rapidly in sizes below 80 mesh.

Unfortunately, the use of ground walnut hulls necessitates the by-passing of the mud screens resulting in an undesirable build-up of clay solids in the drilling fluid. Furthermore, the incorporation of walnut hulls in the drilling fluid results in an increase in pump pressure, sometimes to such an extent that formations may be fractured thus inducing lost circulation. Both high clay solids and walnut hulls act to decrease penetration rate.

The 1977-78 *Guide to Drilling, Workover and Completion Fluids*, Gulf Publishing Company, Houston, Texas, lists some 62 proprietary drilling fluid lubricant additives offered by various drilling fluid additive suppliers. All of these compounds, composed of the above cited oils and soft solids lubricating materials, attest to the interest in, and need for, practical and effective means of reducing drag and rotating torque in the rotary drilling of wells.

The design and formulation of lubricant additives is made difficult by the fact that there are no standard methods of evaluating the effectiveness of such additives by laboratory tests.

Such testing was recently studied by a task group of the Committee on Standardization of Drilling Fluid Materials of the American Petroleum Institute. The variables involved, it was found, made such tests of little value in predicting the actual field performance of a given additive. Thus, despite of the obvious desirability of meaningful testing of lubricant additives, the task group was disbanded.

Regardless of the effectiveness of a drilling fluid lubricant in reducing friction in a laboratory friction test or in the field, the additive can be useful only if it meets criteria of practicality. It must not impair necessary drilling fluid properties of chemical or physical nature. It is recognized in the prior art that a lubricant may have limitations which seriously effect its usefulness. For example, a lubricant additive must have tolerance to the variation in pH and electrolytes normally encountered while drilling. Some additives curdle and ball up in the presence of calcium and are removed on the shale shaker screens. Other additives will cause oil wetting of barite in water base fluids or water wetting of barite in oil base fluids. In either case, the barite may objectionably settle out in low weight fluids or cause objectionably high viscosities in high weight fluids. Some additives cause foaming with the result that the mud becomes gas cut and unpumpable in the reciprocating mud pumps. Other additives resist wetting out and dispersion in the drilling fluid and float on the mud pits or are removed and discarded by the screens. Some additives fluoresce in ultraviolet light and thus interfere with certain well logging operations. Some of the proposed additives are effective only in uneconomical concentrations. Other additives may be potentially toxic, carcinogenic or environmentally undesirable.

DESCRIPTION OF THE PREFERRED EMBODIMENT

Contrary to expectations based upon prior art considerations, I have found that when hard, non-softening minute solid glass spheres (beads) are introduced into a drilling fluid that a surprising reduction in rotating torque and drag occurs in rotary drilling of oil and gas wells. Considering the a priori unpredictable properties of drilling fluid additives it would not be anticipated that such glass beads would in fact function as a friction reducer in drilling fluids.

The glass beads of my invention are essentially spherical, devoid of gas inclusions, composed of chemically resistant lime-silica glass having a hardness of 5.5 on the Moh's scale and a particle size of 88 to 44 microns (through 170 mesh on 325 mesh screens). If such beads are added to a circulating drilling fluid through the chemical hopper or otherwise in amounts ranging from 2 pounds to 8 pounds per barrel of oil base or water base drilling fluid, a significant reduction in rotating torque and drag results.

The friction reducing effect of the glass beads may be utilized in fresh water, calcium inhibited, salt or sea water aqueous drilling fluid at all suitable pH ranges. These glass beads have a softening point of 1,346° F. (730° C.) and a melting point of 1,600° F. (871° C.). Inasmuch as drilling fluids infrequently attain a temperature of 500° F. (260° C.), no melting or softening of the glass beads would be expected in drilling operations.

The hardness of the glass beads is considerably less than drilling rig steels (530 knoop for the beads, 800 to 1,670 knoop for the steels). The degree of hardness of the beads is such that it is not abrasive to drilling equipment but it is distinctly not a soft solid, such as are conventionally used as lubricants. Materials with a hardness less than 3.0 tend to abrade too rapidly in a circulating drilling fluid. The established industrial use of the subject glass beads in plastic injection molding compositions in 40% loadings without causing extrusion die erosion is a further indication of the non-abrasive nature of the glass beads of my invention.

The solid nature of the subject beads and absence of gas inclusions contributes to the resistance of the beads to comminution by the shear forces present in the drilling operation.

The nature of the glass beads facilitates their incorporation into drilling fluids resulting in a non-flocculant dispersion.

The particle size distribution of the subject beads (170-325 mesh) enables them to be recirculated without removal by 80 mesh mud screens. Minus 200 mesh beads may be used if desired.

Neither laboratory or field use has found the incorporation of the non-toxic subject glass beads to cause any adverse side effects on drilling fluid properties.

It is not fully understood how the method of this invention accomplishes friction reducing results by materials so strinkingly different from the prior art of drilling fluid lubricant additives. However, although it is not intended that this invention be bound by any speculations or theoretical explanations, certain characteristics relevant to the physical-chemical properties of glass beads should be noted.

The glass beads of my invention do not qualify as surface active agents and do not lower surface or interfacial tensions of liquids or act as wetting agents. Neither are they classifiable as soft solids capable of reducing friction by full fluid flow or hydrostatic mechanisms. It may be, nevertheless, that the micro glass beads function as a mechanical analog of chemical E.P. lubricants (Browning, W. C., in "Composition and Properties of Oil Well Drilling Fluids," Walter F. Rodgers, pps. 627-630, Gulf Publishing Company, Houston, Texas, 1963).

The unexpected lubricating effect of glass microspheres in drilling fluids, however, may be a surface area related effect in which the "ice" structure of bound water at the glass surface produces a result somewhat similar to metal stearates in ordinary grease compositions ("Water — A Comprehensive Treatise," Felix Frank, Ed. Vol. 5, Plenum Press, New York, 1975; Williams, P. S., Jour. Applied Chemistry (London) 3, 120 (1953); Sweeny, K. H. and Geckler, R. D., Jour. Applied Phys. 25, 1135 (1954).

MATERIAL

The preferred glass beads of my invention are Ballontoni Impact Beads manufactured under U.S. Pat. Nos. 2,334,578; 2,619,776; 2,945,326; and 2,947,115.

To function as a practical and useful additive to reduce rotating torque and pipe drag in rotary drilling, it is essential that the solid glass beads be as nearly 100% spherical as possible. Roundness is controlled during manufacture according to ASTM 1155-53.

The preferred size range of the glass beads of my invention is 170 to 325 U.S. Standard Sieve. Size is determined according to Mil Spc G-9954 A. The maximum allowable broken or angular particles are 3% by count. The beads are solid without gas inclusions. The amount of accidental gas inclusion is microscopically determined and limited during manufacture according to Mil G-9954 using a 1.50 refractive index fluid. The true density of the beads is maintained within 2.45-2.55 gm/$cc^3$, and the hardness is 5.5 on the Moh's scale (530 knoop).

To assure low chemical reactivity of the silica lime glass used in bead manufacture, the silica content is maintained above 67% as determined by ASTM C-169-57T.

The chemical durability of the subject glass beads has been reported by Keppel and Walker (*Ind. Eng. Chem. Product Research*, 1, 132 (1962).

The preferred glass beads of my invention are nontoxic chemically and physically, and meet all non-hazardous industrial use requirements including U.S. military specifications.

Most particularly, the subject solid glass micro spheres have been found to be compatible with the chemistry of water base and oil base drilling fluids and to cause no undesirable chemical or physical side effects on drilling fluid properties.

The usefulness and practicality of my invention is illustrated in the following examples of actual field tests wherein the method of my invention was used to reduce rotating torque and drag during the rotary drilling of oil wells.

EXAMPLE I

A well drilled in Harris County, Texas, with a projected depth of 9,471 feet deviated at 3,000 feet to an angle of 19-½°. The well was corrected back to vertical at 8,356 feet resulting in a borehole with an "S" shape double curve. The glass beads of my invention were added at 8,800 feet. The drag on pipe being pulled from the hole before adding the beads was 37,000 pounds. After adding 4 pounds of beads per barrel of water base drilling mud, the drag was reduced to 25,000 pounds, a reduction of 32.4% in drag. Rotating torque was also reduced by 6.25%.

The drilling fluid before adding the beads had a viscosity of 52 centipoise and an API fluid loss of 6.2 ml. After adding the beads the viscosity was 52 centipoise and the water loss was 6.0 ml. The addition of the beads, therefore, was essentially without effect upon the viscosity and filtration rate of the drilling fluid.

EXAMPLE II

A well was drilled offshore Louisiana with an oil base drilling fluid. At 16,143 feet of depth, 4 pounds per barrel of the glass beads of my invention were added to the oil base drilling fluid. The rotating torque before adding the beads was recorded as 560 amperes, after adding the beads a rotating torque of 490 amperes was recorded, a reduction of 12.5%.

The oil base fluid before addition of the glass beads had a viscosity of 61 cp, after addition of the beads the viscosity was 61 cp. Thus in contrast to chemical drilling fluid lubricants, the glass beads of my invention have a demonstrable effectiveness in both water base and oil base drilling fluids.

EXAMPLE III

A well projected to 10,000 feet in the North Dryersdale Field in Harris Country, Texas deviated at 2,000 feet to an angle of 28° and was corrected back to vertical at 8,643 feet. This reverse curvature caused excessive drag and rotating torque problems. 4 pounds per barrel of the glass beads of my invention were added to the water base drilling fluid at 7,253 feet. After addition of the glass beads the upward drag was reduced from 50,000 pounds to 35,000 pounds, a reduction of 30%. Rotating torque was reduced 50% to 66%. No significant change in mud properties was noted.

EXAMPLE IV

A 9,600 foot well drilled in the Texas Gulf region with a Lignosulfonate-Lignite treated drilling fluid, deviated at 4,000 feet attaining at 17° angle and was then corrected back to vertical at 8,122 feet. The drilling fluid was treated with 4 pounds per barrel of the glass beads of my invention at a depth of 8,200 feet. Before addition of the glass beads the indicated torque ranged from 125 to 130 and the upward drag ranged from 15,000 pounds to 20,000 pounds. After addition of the glass beads the indicated torque was reduced to 90 and the upward drag was reduced to a range of 8,000 pounds to 10,000 pounds. The torque and drag reduction thus effected by addition of 4 pounds of the glass beads of my invention per barrel of water base drilling fluid in this instance amounted to 29.5% for torque and 46.5% to 50% for drag.

Drilling fluid viscosity remained unchanged and API filtration rate was 6.4 ml before addition of the beads and 6.0 ml after addition of the glass beads of my invention.

By the preceding examples and additional field usage, it has been demonstrated that the Ballontoni glass beads of my invention, which are essentially spherical, chemically resistant lime-silica glass beads having a hardness of 5.5 on the Moh's scale and a particle size range of 88 microns to 44 microns, when used in amounts ranging from 2 pounds to 8 pounds per barrel of water base or oil base drilling fluids, will effectively reduce rotating torque and drag in the rotary drilling of oil and gas wells.

The glass beads of my invention have been shown to be chemically and physically compatible with oil well drilling fluids causing no deleterious effects on drilling fluid properties.

The compatibility of the glass beads of my invention with oil or water base drilling fluids means that they may be compounded as an additive blend, or used in conjunction with surface active and soft solid types of drilling fluid lubricant additives. These micro-spherical glass beads may also be blended in obvious ways with other drilling fluid additives, such as thinners (dispersing agents), viscosifiers, bentonite, fluid loss control additives and lost circulation control materials to effect reduction in torque and drag.

Thus, while certain embodiments of my invention have been described for illustrative purposes, various other modifications will be apparent to those skilled in the art in view of the disclosure. Such modifications are within the spirit and scope of the invention.

What is claimed is:

1. A method of reducing torque and drag in a wellbore having drilling fluid therein, including the addition of quantities of solid minute spherical glass beads without gas inclusions to the drilling fluid, such glass beads having a particle size of 88 to 44 microns and a hardness of 5.5 on the Moh's scale.

2. The invention of claim 1, wherein:
such beads are made of soda-lime glass and approximately 60 to 80% of the glass beads are spherical and no more than 3% of the glass beads have sharp or angular surfaces.

3. The invention of claim 1 wherein:
the beads have a silica content above 67% and a true density within the range of 2.45 to 2.55 g/cm$^3$.